REMOTE-CUTOFF FIELD EFFECT TRANSISTOR

Filed Nov. 10, 1965

INVENTOR.
DAVID F. HILBIBER,
BY Roger S. Borovoy & Stuart Lubitz
ATTORNEYS.

United States Patent Office 3,405,330 Patented Oct. 8, 1968

3,405,330
REMOTE-CUTOFF FIELD EFFECT TRANSISTOR
David F. Hilbiber, Los Altos, Calif., assignor to Fairchild Camera and Instrument Corporation, Syosset, N.Y., a corporation of Delaware
Filed Nov. 10, 1965, Ser. No. 507,134
5 Claims. (Cl. 317—235)

ABSTRACT OF THE DISCLOSURE

A semiconductor field-effect device having a remote-cutoff characteristic and having a channel region with a pair of spaced channel contacts. Between the channel contacts is a monocrystalline gate region which forms a continuous interruption of the current path at the surface of the device between the pair of channel contacts, except for a gap. The gap provides a second current path through the channel region at the surface so as to modify the characteristics of the field-effect device to provide a remote-cutoff characteristic.

This invention relates to a field-effect transistor (FET) having a remote-cutoff characteristic.

The field-effect transistor is described in detail in the article "A Unipolar Field Effect Transistor," Shockley, W., Proc. I.R.E., vol. 40, pp. 1365–1376 (November 1950). Briefly, such a device comprises a channel region having a gate intermediate a source and drain. The channel is a monocrystalline semiconductor region having a first conductivity type. The gate may be a monocrystalline semiconductor region having a conductivity type opposite the channel to form a PN junction with the channel intermediate the source and drain. Other field-effect devices use a metal-oxide-silicon gate. The reverse biasing of the PN junction gate causes a depletion region to form which changes the conductivity of the channel and, consequently, effects the amount of the current passing from the source to the drain. When the gate is sufficiently reverse biased, the channel is pinched off and current essentially ceases. In the usual device, this pinch-off condition is approached in an abrupt manner with the gain of the device extremely sensitive to bias voltage values approaching the pinch-off voltage. The abrupt pinch-off characteristic is not detrimental for switching applications but it makes the device unsuitable for control applications. For such applications, the FET should have a gradual pinch-off characteristic with reduced gain sensitivity at values approaching pinch-off. Such a characteristic is commonly referred to in the vacuum tube art as a remote-cutoff characteristic.

Another problem incident to a conventional FET having an abrupt pinch-off or cutoff is the distortion imparted when a large range of signal levels must be accommodated.

There has been some suggestion by some experimenters in the art that a field-effect device having a remote-cutoff characteristic may be fabricated. One possible approach to providing such a device contemplates applying a non-uniform distribution of bias between the gate and channel. This may be accomplished by employing a continuous loop gate region with two contacts at opposite ends of the loop and by selecting the gate region impurity concentration to obtain a particular resistance between the contacts. If one of the contacts is grounded and the other receives a bias signal, a graded cutoff is obtained. However, such a device is impractical because of the difficulty in its fabrication. This difficulty arises because the diffusion of the gate region must be precisely controlled over its entire length to arrive at the particular resistance value between the contacts.

This invention provides a field-effect device which has a remote-cutoff characteristic and yet which also may be readily fabricated. The remote-cutoff characteristic is achieved by altering the usual configuration of the gate while maintaining a simple geometry. In general, the gate is altered to include a discontinuity such as a port. The voltage that is required to pinch-off (or deplete) the channel in the vicinity of the discontinuity is much greater than the voltage required to pinch off the remainder of the channel. The combined characteristic of the channel in the vicinity of the discontinuity and characteristic of the remainder of the channel provides a device having a remote-cutoff characteristic. The exact nature of the cutoff characteristic may be easily changed by changing the geometry of the discontinuity such as by altering the length or other dimensions of the discontinuity. The discontinuity can easily be added to the gate without complicating the fabrication processes.

Briefly, the structure of the invention comprises a monocrystalline semiconductor channel region having a first conductivity type; a means for making source and drain contacts on opposite ends of said channel; and, a gate intermediate said means having a discontinuity. The discontinuity is proportioned with respect to the remainder of the gate to manifest a discrete characteristic distinct from the remainder of the gate.

The above generally-described structure and advantages of the invented device will be readily understood by reference to the drawings, wherein.

Figures 1, 2, 3, 4:
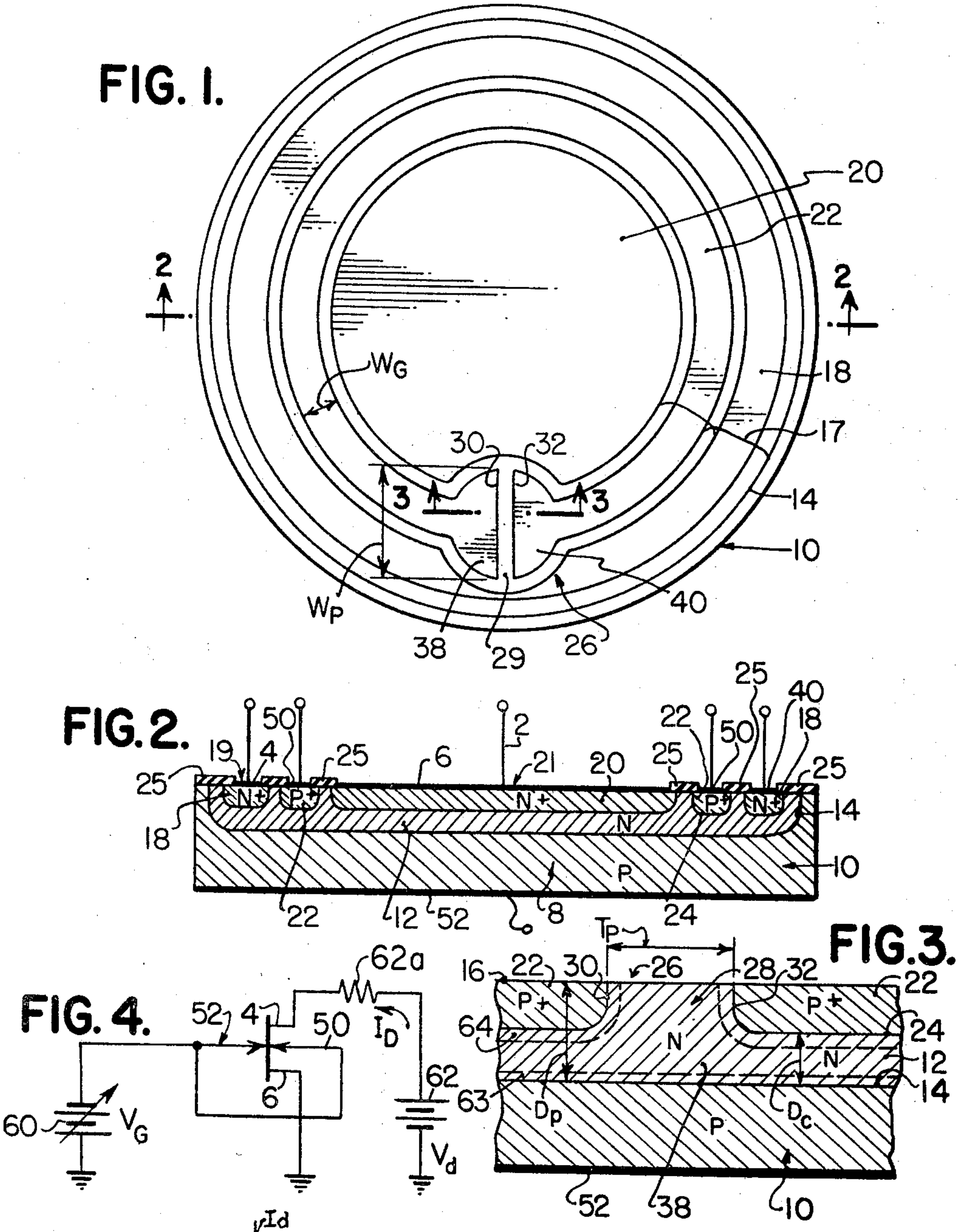
FIG. 1 is a plan view of one embodiment of the invented semiconductor device with its protective layer and metallized contacts removed.
FIG. 2 is a sectional view taken along the line 2—2 of FIG. 1 with the protective layer and contacts attached.
FIG. 3 is an enlarged sectional view taken along the line 3—3 of FIG. 1.
FIG. 4 is a diagram of a circuit incorporating the device.

Referring to FIGS. 1 to 3, the field-effect device compises a monocrystalline semiconductor wafer 10 having a given conductivity type, such as a P-type conductivity. A monocrystalline semiconductor channel region 12 in the form of an island is located within wafer 10. Channel 12 has a first conductivity type, such as an N-type conductivity, that forms a junction 14 with wafer 10 which extends to surface 16. Drain contact 4 and source contact 6 are applied to the surfaces of regions 18 and 20, respectively, which are areas of channel 12 having a higher concentration of dopant (i.e., N+). These regions of higher concentration facilitate the forming of ohmic contacts by conductive materials, such as aluminum, which are commonly employed as contacts. It is possible in certain instances to eliminate regions 18 and 20 by employing a P-type channel which readily forms an ohmic contact. The region 20 to which the source contact 6 is attached is within region 18 and substantially concentric therewith. It should be noted that the source contact 6 to region 20 may be employed as the drain contact and the drain contact 4 to region 18 may be employed as the source contact without departing from the essential content of the invention. However, throughout the remainder of the specification for purposes of convenience, contact 4 and region 18 will be referred to as "drain 19" and contact 6 and region 20 as "source 21." The contacts and regions may be refered to generally as means for making source and drain contacts to opposite ends of channel 12.

A monocrystalline semiconductor gate region 22 in the form of an island having a conductivity type opposite to channel 12 (i.e., P-type) is located intermediate drain 19 and source 21 and is located adjacent and within the channel 12. The gate 22 forms a PN junction 24 with channel 12 which extends to surface 16. The wafer 10 and channel 12 form a second PN junction 14 which when properly biased acts as a second gate or bulk gate 8.

All of the junctions that extend to surface 16 are protected by a protective layer 25, such as described in U.S. Patent No. 3,025,589. Metalized contacts 4, 6, 50 and 52 are formed on regions 18 and 20, gate 22 and the bottom of wafer 10, respectively, such as described in U.S. Patent No. 2,981,877, issued to R.N. Noyce, Apr. 25, 1961. The application of voltages to gates 8 and 22 which reverse biases junctions 14 and 24 results in a depletion region in the vicinity of junctions 14 and 24. These depletion regions alter the conductivity of channel 12 between drain 19 and source 21 according to the magnitude of the applied bias voltage.

The gate 22 as shown in FIG. 2 has a substantially constant cross section along a substantial portion of its length or perimeter. However, this cross section has at least one discontinuity 26 as clearly shown in FIGS. 1 and 3. The discontinuity 26 may be a port or gap 28 which forms a distinct alternate path between drain 19 and source 21. The port 28 is bounded on at least two of its sides 30 and 32 by the gate 22 (FIG. 3). The width $W_P$ of port 28 (FIG. 1) may be the same as the width $W_G$ of gate 22, but as shown in FIG. 1, the port width $W_P$ is substantially greater than gate width $W_G$. This greater width is achieved by a pair of semi-circular gate portions 38 and 40 (FIG. 1). Since portions 38 and 40 may take on many different shapes, the circular configuration is shown only for purposes of illustration. The port 28 has a depth $D_P$ and a thickness $T_P$ (FIG. 3). Typically, depth $D_P$ is 2 to 3 microns while channel 12 has a depth $D_C$ of 0.5 to 1 micron. The thickness $T_P$ of port 28 is substantially larger than channel depth $D_C$, that is, thickness $T_P$ is approximately 2–4 times greater than depth $D_C$. While the above range of values is preferred, it is within the scope of the invention to employ other values. The port 28 with its greater thickness and depth requires a substantially greater applied voltage to achieve pinch-off as compared with channel 12. Typically, the pinch-off voltage for port 28 is several times larger than for channel 12. It should be understood that the geometry and proportions of the discontinuity may be varied to achieve a particular cutoff characteristic. For example, the length 34 of port 28 may be altered to change the characteristic of the device as it approaches cutoff.

The geometry employed in the above-described device is circular with the drain, source, gate and channel having a substantially circular configuration. It is, of course, within the scope of the invention to employ square, rectangular, interdigitated or any of the other forms of geometry employed in semiconductor devices. It is preferred that the device be fabricated from monocrystalline slicon with protective layer 25 being silicon dioxide. The various areas of opposite conductivity types and differing resistivities are diffused into wafer 10 by well-known photoengraving and diffusion techniques such as described in U.S. Patent No. 3,025,589, issued to J. A. Hoerni on Mar. 20, 1962. It is within the broad scope of the invention to employ other semiconductor materials as well as other processing techniques.

The device shown in FIGS. 1 to 3 is shown connected in a circuit in FIG. 4. The manner in which field-effect devices may be employed in circuits is well known. Briefly, power supply 60 has its negative terminal connected to gate contacts 50 and 52 to reverse bias the gates with a voltage $V_G$. The positive terminal of a supply 62 supplies voltage $V_d$ to drain contact 4 through load resistor **62*a*. The source contact 6, the positive terminal of supply 60, and the negative terminal of supply 62** are connected to ground.

Figure 5:
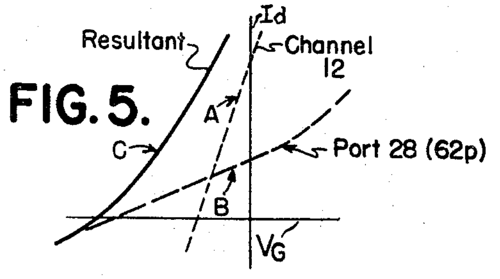
FIG. 5 is a graph showing the cutoff characteristic of the invented device.

With the above-structural details in mind, the operation of the invented device can now be considered. An input signal is applied to gate 8 and gate 22 via contacts 52 and 50, respectively, to reverse bias the gates and form depletion regions 63 and 64 in the vicinity of junctions 14 and 24. As the reverse bias is increased, the size of the depletion region will increase and the current from source 21 to drain 19 via channel 12 will decrease. Similarly, the current from source 21 to drain 19 via port 28 will also decrease with the increase of reverse bias. The decrease of current via channed 12 will occur much more abruptly than the decrease of current via port 28. This difference in the pinch-off characteristic of the channel and the port is attributable to the depletion region occupying a larger percentage of channel 12 with a given gate voltage applied as compared with the depletion region associated with port 28. Physically, this difference results largely from the difference in dimensions $D_C$ and $T_P$. Thus, channel 12 will pinch off first while port 28 will pinch off at a substantially greater reverse bias. For example, as shown in FIG. 5, curve A, which is representative of the characteristic of channel 12, will pinch off at −3 volts while curve B, which is representative of the characteristic of port 28, will pinch at −25 volts. Thus, the device has two discrete characteristics, that is, two pinch-off voltages. These characteristic curves A and B combine to form a resultant characteristic for the overall device as approximately shown by a curve C. This resultant curve essentially portrays a device having a remote-cutoff characteristic. Thus, an overall device having a remote-cutoff characteristic is provided.

In accordance with the invention, the resultant curve C may be readily adjusted by altering the width of port 28. An increase in the width $W_P$ of port 28 will result in curve B shifting downwardly while a shortening of $W_P$ will move curve B upwardly. In this manner, the resultant in curve C may be shaped to achieve the desired remote-cutoff characteristic. The resultant of curve C may also be shaped by adding additional discontinuities, by changing the geometry of the discontinuity or altering the thickness $T_P$ to mention a few variants of the invention.

In summary, a field-effect device has been invented that provides a remote-cutoff characteristic. This is accomplished by a relatively simple arrangement of altering the configuration of the gate and providing a channel having two distinct characteristics. These characteristics combine to form a device having a remote-cutoff characteristic. A field-effect device employing these principles may readily be fabricated by the well-known planar processes without the necessity for additional steps and without substantially increasing the precision required in executing the fabrication steps.

Although this invention has been disclosed and illustrated with reference to a particular embodiment, the principles involved are susceptible to numerous variations which will be apparent to persons skilled in the art. For example, the source and drain may be reversed as well as the particular conductivity types employed in the various regions. The invention is, therefore, to be limited only as indicated by the scope of the appended claims.

What is claimed is:

1. A semiconductor field-effect device having a remote-cutoff characteristic comprising:

a monocrystalline semiconductor wafer of a first conductivity type having a surface;

a monocrystalline semiconductor channel region of opposite conductivity type within said wafer extending to said surface;

a pair of spaced contact means for making electrical contact with two spaced portions of the surface of said channel region;

a monocrystalline semiconductor gate region of said first conductivity type extending downwardly from said surface, leaving a layer of said channel region beneath said gate region and above the semiconductor material of said wafer of said first conductivity type to provide a first current path between said spaced contact means through said channel beneath said gate region, said gate region forming a continuous interruption of the current path at said surface through said channel between said pair of spaced contact means except for a single gap in said gate region at said surface, said gap providing a second current path through said channel region at said surface, whereby said gap modifies the characteristics of the field-effect device to provide a remote-cutoff characteristic.

2. The semiconductor field-effect device of claim 1 further characterized by said gate region having a substantially constant cross-section.

3. The semiconductor field-effect device of claim 1 further characterized by said spaced contact means including a pair of regions of semiconductor material of said opposite conductivity type having a higher concentration of impurities than the remainder of said channel region.

4. The semiconductor field-effect device of claim 3 further characterized by said pair of regions being concentric circles and said gate region being a third concentric circle between said pair of concentric circles.

5. The semiconductor field-effect device of claim 4 further characterized by said gate region having a substantially constant cross-section except in the region adjacent said gap, wherein said cross-section is larger.

References Cited

UNITED STATES PATENTS

| | | | |
|---|---|---|---|
| 2,951,191 | 8/1960 | Herzog | 317—235 |
| 3,275,845 | 9/1966 | Csanky | 317—235 |
| 3,358,195 | 12/1967 | Onodera | 317—235 X |
| 3,358,198 | 12/1967 | Van Overbeek | 317—235 |

JOHN W. HUCKERT, *Primary Examiner.*

R. F. POLISSACK, *Assistant Examiner.*